(12) United States Patent
Papakos et al.

(10) Patent No.: US 9,672,720 B2
(45) Date of Patent: Jun. 6, 2017

(54) METHOD AND APPARATUS FOR VISUALLY INDICATING CONNECTIONS BETWEEN MULTI-WAVELENGTH INTERFACES AND UNI-WAVELENGTH INTERFACES

(71) Applicants: Kimon Papakos, Evanston, IL (US); Mark E. Boduch, Geneva, IL (US)

(72) Inventors: Kimon Papakos, Evanston, IL (US); Mark E. Boduch, Geneva, IL (US)

( * ) Notice: Subject to any disclaimer, the term of this patent is extended or adjusted under 35 U.S.C. 154(b) by 104 days.

(21) Appl. No.: 14/920,276

(22) Filed: Oct. 22, 2015

(65) Prior Publication Data

US 2016/0042632 A1 Feb. 11, 2016

Related U.S. Application Data

(63) Continuation of application No. 14/014,493, filed on Aug. 30, 2013, now abandoned.

(51) Int. Cl.
| | |
|---|---|
| *G08B 21/00* | (2006.01) |
| *G08B 21/18* | (2006.01) |
| *H04J 14/02* | (2006.01) |
| *H04Q 1/02* | (2006.01) |
| *G08B 5/36* | (2006.01) |

(52) U.S. Cl.
CPC ............ *G08B 21/18* (2013.01); *G08B 5/36* (2013.01); *H04J 14/021* (2013.01); *H04J 14/0227* (2013.01); *H04Q 1/136* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,024,088 | B1 * | 4/2006 | Davis | G02B 6/4482 385/135 |
| 8,165,468 | B2 * | 4/2012 | Boduch | H04J 14/0204 370/401 |
| 8,447,183 | B2 | 5/2013 | Boduch et al. | |
| 9,280,883 | B2 * | 3/2016 | Papakos | G08B 7/06 |
| 9,336,662 | B1 * | 5/2016 | Papakos | G08B 7/06 |
| 9,443,403 | B2 * | 9/2016 | Papakos | G08B 7/06 |
| 9,449,478 | B2 * | 9/2016 | Papakos | G08B 7/06 |
| 2002/0126339 | A1 * | 9/2002 | Sato | H04B 10/077 398/9 |
| 2011/0095874 | A1 * | 4/2011 | Bennett | G10H 1/0008 340/326 |
| 2012/0079139 | A1 * | 3/2012 | Sonokawa | H04L 41/12 710/16 |

* cited by examiner

*Primary Examiner* — Travis Hunnings

(57) ABSTRACT

A method and apparatus for visually indicating the connections between optical interfaces is provided. The optical interfaces may include multi-wavelength optical interfaces and uni-wavelength optical interfaces. The optical interfaces may reside within optical nodes contained within an optical network.

21 Claims, 6 Drawing Sheets

METHOD AND APPARATUS FOR VISUALLY INDICATING CONNECTIONS BETWEEN MULTI-WAVELENGTH INTERFACES AND UNI-WAVELENGTH INTERFACES

RELATED APPLICATION

This application is a continuation of U.S. application Ser. No. 14/014,493, filed Aug. 30, 2013. The specification of the present invention is substantially the same as that of the parent application. The "Related Application" paragraph has been revised to include a specific reference to the parent application. The specification of the present invention contains no new subject matter.

BACKGROUND

In a Wavelength Division Multiplexed (WDM) optical communication node, optical connections are configured between a plurality of uni-wavelength ports and a plurality of multi-wavelength ports. In prior-art optical nodes, there was no visual indication of which uni-wavelength ports are connected to which multi-wavelength ports, thus leading to confusion and unintended disruptions in service during maintenance periods.

SUMMARY

A method and corresponding apparatus for visually indicating the connections between multi-wavelength interfaces and uni-wavelength interfaces is presented. The apparatus comprises a first multi-wavelength interface with a first multi-wavelength interface indicator capable of indicating a first state, at least a second multi-wavelength interface with a second multi-wavelength interface indicator capable of indicating a second state, and at least one uni-wavelength interface with a uni-wavelength interface indicator capable of indicating the first state and the second state. A connection between the at least one uni-wavelength interface and the first multi-wavelength interface is indicated by the uni-wavelength interface indicator indicating the first state. A connection between the at least one uni-wavelength interface and the at least second multi-wavelength interface is indicated by the uni-wavelength interface indicator indicating the second state.

The apparatus may be contained within an optical node within an optical network. In such a case, the apparatus may be partitioned across multiple circuit packs, or it may reside within a single circuit pack, or a single mechanical structure (such as an electrically powered enclosure).

The multi-wavelength interface indicators may be passive indicators (requiring no electrical power), or they may be active indicators (requiring electrical power).

The multi-wavelength and uni-wavelength interface indicators may comprise of multi-color light sources. Each multi-color light source may be implemented with multiple light emitting diodes (LEDs) within a single mechanical package, such as commercially available bi-color LEDs (with two LEDs) or tri-color LEDs (with three LEDs). Therefore, the first multi-wavelength interface indicator may include a first light emitting diode, and the second multi-wavelength interface indicator may include a second light emitting diode, and the uni-wavelength interface indicator may include a third light emitting diode. For this case, the first state may be indicated with a first color, and the second state may be indicated with a second color.

Alternatively, the first multi-wavelength interface indicator may comprise a first alphanumeric display, and the second multi-wavelength interface indicator may comprise a second alphanumeric display, and the uni-wavelength interface indicator may comprise a third alphanumeric display. For this case, the first state may be indicated with a first letter or numeral, and the second state may be indicated with a second letter or numeral.

Alternatively, the first multi-wavelength interface indicator may include a first passive indicator, and the second multi-wavelength interface indicator may include a second passive indicator, and the uni-wavelength interface indicator may include an active indicator.

A connection between the at least one uni-wavelength interface and the first multi-wavelength interface, and the at least one uni-wavelength interface the at least second multi-wavelength interface may be indicated by the uni-wavelength interface indicator alternating (cycling or sequencing) between the first state and the second state.

The apparatus may further comprise at least a third multi-wavelength interface with a third multi-wavelength interface indicator capable of indicating a third state. For this case, the uni-wavelength interface indicator is further capable of indicating the third state. A connection between the at least one uni-wavelength interface and the first multi-wavelength interface, and the at least one uni-wavelength interface the at least second multi-wavelength interface, and the at least one uni-wavelength interface and the at least third multi-wavelength interface is indicated by the uni-wavelength interface indicator cycling (sequencing) from the first state, to the second state, to the third state, and back to the first state.

The method for indicating connections between interfaces comprises indicating a first state with a first interface indicator of a first interface, indicating a second state with a second interface indicator of a second interface, and indicating the first state and the second state with a third interface indicator of a third interface. The third interface indicator indicates a connection between the third interface and the first interface by indicating the first state. The third interface indicator indicates a connection between the third interface and the second interface by indicating the second state.

In the method, the first interface indicator may include a first light emitting diode, and the second interface indicator may include a second light emitting diode, and the third interface indicator may include a third light emitting diode.

Alternatively, in the method, the first interface indicator may comprise a first alphanumeric display, and the second interface indicator may comprise a second alphanumeric display, and the third interface indicator may comprise a third alphanumeric display.

Alternatively, in the method, the first interface indicator may include a first passive indicator, and the second interface indicator may include a second passive indicator, and the third interface indicator may include an active indicator of some type (multi-color or alphanumeric, for example).

Alternatively, in the method, the first interface indicator may comprise at least two light emitting diodes, and the second interface indicator may comprise at least two light emitting diodes, and the third interface indicator may comprise at least two emitting diodes.

Within the method, the first state may be indicated by a first color and the second state may be indicated by a second color.

Also, within the method, a connection between the third interface and the first interface, and the third interface and the second interface may be indicated by the third interface indicator alternating between the first state and the second state.

Within the method, the first interface and the second interface may be multi-wavelength interfaces, while the third interface may be a uni-wavelength interface.

Another embodiment of the invention comprises an optical node comprising a first multi-wavelength interface with a first multi-wavelength interface indicator capable of illuminating with a first color, at least a second multi-wavelength interface with a second multi-wavelength interface indicator capable of illuminating with a second color, and at least one uni-wavelength interface with a uni-wavelength interface indicator capable of illuminating with the first color and the second color. The optical node supports connections between the at least one uni-wavelength interface and the first multi-wavelength interface, and between the at least one uni-wavelength interface and the at least second multi-wavelength interface. These connections are referred to as intra-node connections. An intra-node connection between the at least one uni-wavelength interface and the first multi-wavelength interface is indicated by illuminating the uni-wavelength interface indicator with the first color, and a an intra-node connection between the at least one uni-wavelength interface and the second multi-wavelength interface is indicated by illuminating the uni-wavelength interface indicator with the second color.

The optical node is also capable of establishing connections to and from a second node within an optical network. These connections are referred to as inter-node connections. More specifically, an inter-node connection may be established between the at least one uni-wavelength interface (within the node) and a second uni-wavelength interface of a second optical node through the first multi-wavelength interface. A problem with the inter-node connection may be indicated by the uni-wavelength interface indicator by alternating between the first color and no color. That is to say, a problem with the inter-node connection may be indicated by the uni-wavelength interface indicator by turning the indicator on and off.

The optical node is capable of establishing a first inter-node connection between the at least one uni-wavelength interface and a second uni-wavelength interface of a second optical node through the first multi-wavelength interface. Additionally, the optical node is capable of establishing at least a second inter-node connection between the at least one uni-wavelength interface and a third uni-wavelength interface of a third optical node through the at least second multi-wavelength interface. For this broadcasting scenario, the uni-wavelength interface indicator indicates the first inter-node connection and the at least second inter-node connection by alternating between the first color during a first time period and the second color during a second time period. If there is a problem with the first inter-node connection, the problem may be indicated by the uni-wavelength interface indicator by alternating between the first color and no color during the first time period.

The optical node may further comprise at least one ROADM circuit pack comprising at least the first multi-wavelength interface and the first multi-wavelength interface indicator. The ROADM circuit pack may further comprise the at least a second multi-wavelength interface and the second multi-wavelength interface indicator.

The optical node may further comprise at least one multiplexer and demultiplexer circuit pack comprising the at least one uni-wavelength interface and the uni-wavelength interface indicator. The multiplexer and demultiplexer circuit pack may further comprise a front panel and a printed circuit board. The front panel may comprise at least one optical connector for the at least one uni-wavelength interface. The printed circuit board may comprise the uni-wavelength interface indicator for the at least one uni-wavelength interface. The printed circuit board may be located directly behind the front panel so that the at least one optical connector extends through the printed circuit board.

The optical node may further comprise at least one optical transponder. The optical transponder may have a second uni-wavelength interface indicator whose state matches the state of the uni-wavelength indicator.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Figure 1:
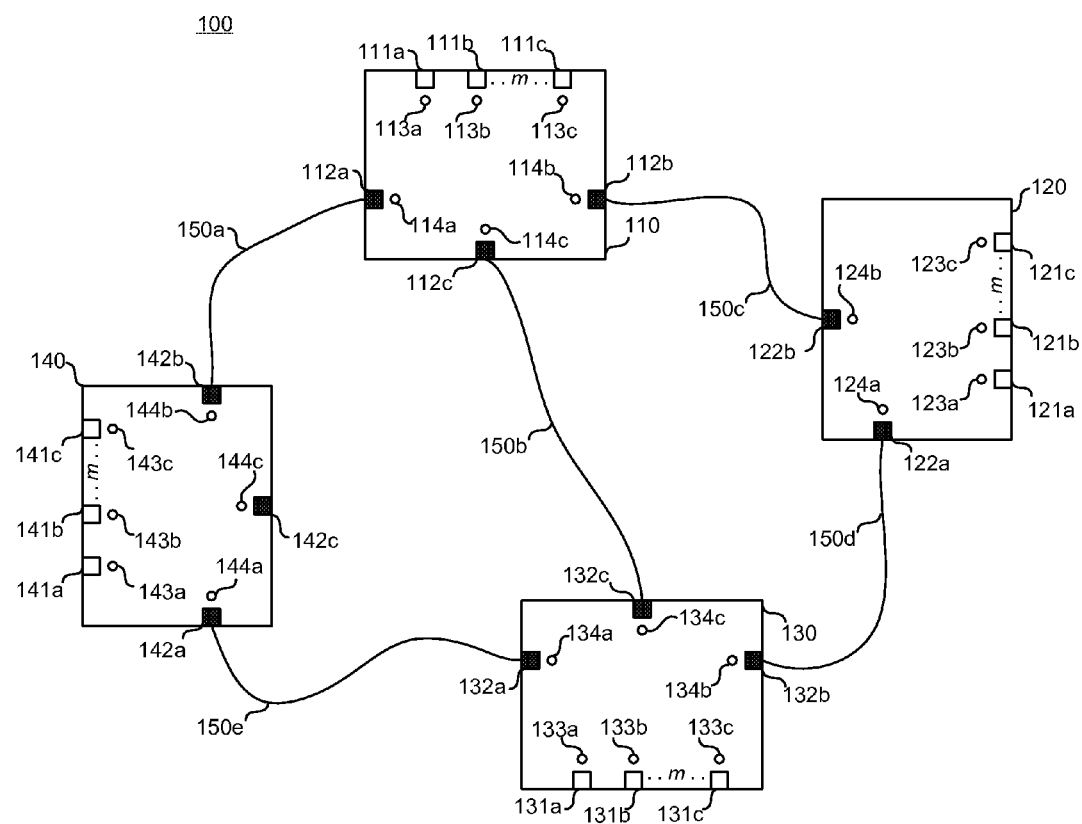
FIG. 1 is an illustration of an optical network containing four optical nodes in an example embodiment of the present invention.

FIG. 1 is an illustration of an optical network 100 containing four optical nodes 110, 120, 130, and 140. Each optical node contains two or three multi-wavelength interfaces 112a-c, 122a-b, 132a-c, and 142a-c used to interconnect each node to other like nodes. Additionally, each optical node contains a plurality of uni-wavelength interfaces 111a-c, 121a-c, 131a-c, and 141a-c. A multi-wavelength interface is capable of supporting one or more wavelengths using wavelength division multiplexing, while a uni-wavelength interface is capable of supporting only a single optical wavelength. Each optical node is connected to two or three other optical nodes via optical fiber cables 150a-e that interconnect the multi-wavelength interfaces of the nodes. Each uni-wavelength interface is used to add and drop wavelengths to and from the fiber that interconnects the nodes. Within an optical node 110, 120, 130, and 140, circuitry is provided that allows a wavelength from a particular uni-wavelength interface (an add port) to be directed to any of the associated multi-wavelength interfaces of the node. Similarly, within an optical node 110, 120, 130, and 140, circuitry is provided that allows a wavelength to be directed to a uni-wavelength interface (a drop port) from any of the associated multi-wavelength interfaces of the node. Often such uni-wavelength interfaces are referred to as directionless uni-wavelength interfaces.

Within each optical node, a multi-wavelength interface indicator (114a-c, 124a-b, 134a-c, and 144a-c) is associated with each multi-wavelength interface, and a uni-wavelength indicator (113a-c, 123a-c, 133a-c, and 143a-c) is associated with each uni-wavelength interface. Each multi-wavelength interface indicator and each uni-wavelength indicator is preferably located adjacent to the corresponding interface or port, as shown in FIG. 1. The interface indicators are used to visually indicate the connections between each multi-wavelength interface and each uni-wavelength interface. In one example embodiment, each multi-wavelength interface indicator and each uni-wavelength interface indicator comprises a multi-color light source, capable of generating any number of colors. Within a given node, each multi-wavelength interface indicator 114a-c, 124a-b, 134a-c, and 144a-c is configured to illuminate with a visual color that is distinct from all other multi-wavelength interface indicators. If there are n multi-wavelength interfaces within a given optical node, then n distinct colors are required (color 1, color 2, color 3 . . . and color n). For instance, for an optical node with three multi-wavelength interfaces (like nodes 110 and 130), multi-wavelength interface 1 may have its associated multi-wavelength interface indicator illuminated with the color green (color 1), while multi-wavelength interfaces 2 and 3 may have their associated multi-wavelength interface indicators illuminated with the colors blue (color 2) and yellow (color 3) respectively. So for example within node 110, multi-wavelength interface indicator 114a associated with multi-wavelength interface 112a would be illuminated green, while multi-wavelength interface indicators 114b and 114c associated with multi-wavelength interfaces 112b and 112c respectively would be illuminated with the colors blue and yellow respectively.

Both the multi-wavelength interfaces and the uni-wavelength interfaces are bidirectional optical interfaces, typically implemented with two fiber optical connectors—one for exiting signal(s), and one for entering signal(s). Therefore, for every optical wavelength entering a uni-wavelength interface, there is typically an associated companion wavelength of the same frequency exiting the same uni-wavelength interface. Similarly, for a set of wavelengths entering a multi-wavelength interface, there is typically an associated set of companion wavelengths of the same optical frequencies exiting the same multi-wavelength interface. When a given wavelength is added to a uni-wavelength interface of a given node, the given node is configured to direct the added outgoing wavelength to one of the n multi-wavelength interfaces of the associated node. In a like manner, the given node is configured to direct the outgoing wavelength's companion incoming wavelength from the same multi-wavelength interface to the same uni-wavelength interface. In this manner, it can be stated that a connection is made between the given uni-wavelength interface and the given multi-wavelength interface. A connection that connects a wavelength between interfaces within an optical node may be called an intra-node connection. Once the connection between the uni-wavelength interface and the multi-wavelength interface is completed, the uni-wavelength interface indicator associated with the uni-wavelength interface is used to indicate that it is connected to the particular multi-wavelength interface. When each interface indicator comprises a multi-color light source, the color of the uni-wavelength interface indicator of the uni-wavelength interface is illuminated with the same color as that of the multi-wavelength interface indicator of the multi-wavelength interface that it is connected to (i.e., the color of the indicator of the uni-wavelength interface is set to match the color of the interface indicator of the multi-wavelength interface). For instance, if a given uni-wavelength interface is connected to multi-wavelength interface 1 whose associated color is color 1, then the uni-wavelength interface indictor of the given uni-wavelength interface is also set to color 1.

Within an optical network, a wavelength may be connected from a first uni-wavelength interface of a first node to a second uni-wavelength interface of a second node. Such a connection may be called an inter-node connection. Multiple intra-node connections (within multiple nodes) may be required in order to establish a single inter-node connection. As a network illustration, assume that a wavelength i is added to uni-wavelength interface 111a of node 110. Further assume that the wavelength's network destination is uni-wavelength interface 131c in node 130. For this case, an inter-node connection must be established between interface 111a and interface 131c. Node 110 is configured to connect wavelength i from uni-wavelength interface 111a to multi-wavelength interface 112a. Node 110 is additionally configured to illuminate the uni-wavelength interface indictor 113a of the uni-wavelength interface 111a to the same color as the multi-wavelength interface indicator 114a of multi-wavelength interface 112a. Node 140 is configured to connect wavelength i from multi-wavelength interface 142b to multi-wavelength interface 142a. Node 130 is configured to connect wavelength i from multi-wavelength interface 132a to uni-wavelength interface 131c. Node 130 is additionally configured to illuminate the uni-wavelength interface indictor 133c of the uni-wavelength interface 131c with the same color as the multi-wavelength interface indicator 134a of multi-wavelength interface 132a.

Continuing the previous network illustration further, assume that the optical fiber 150e between nodes 140 and 130 gets cut, so that no wavelengths can traverse between network node 140 and network node 130 via fiber 150e. Once the network discovers the failure, network nodes 110 and 130 are reconfigured as follows. Node 110 is configured to disconnect wavelength i from multi-wavelength interface 112a. Node 110 is further configured to connect wavelength i from uni-wavelength interface 111a to multi-wavelength interface 112c. Node 110 is additionally configured to illuminate the uni-wavelength interface indictor 113a of the uni-wavelength interface 111a to the same color as the multi-wavelength interface indicator 114c of multi-wavelength interface 112c. Node 130 is configured to disconnect wavelength i from multi-wavelength interface 132a. Node 130 is further configured to connect wavelength i from multi-wavelength interface 132c to uni-wavelength interface 131c. Node 130 is additionally configured to illuminate the uni-wavelength interface indictor 133c of the uni-wavelength interface 131c with the same color as the multi-wavelength interface indicator 134c of multi-wavelength interface 132c.

In general the multi-wavelength interface indicators and uni-wavelength interface indicators have one or more states associated with them. The states associated with a multi-color interface indicator are represented by the n colors in which the multi-color indicator displays. For this case, color 1 is a state, color 2 is a state, and color n is a state, and there are n total color states that an indicator can assume. A alphanumeric display may be used as an interface indicator. The states associated with a alphanumeric display are the various numbers or characters in which the display can display. In normal operation, the multi-wavelength interface indicators for the multi-wavelength interfaces may have a permanent state assigned to them. For instance, if multi-wavelength interface j is assigned the color green, the multi-wavelength interface indicator associated with multi-wavelength interface j will be displaying a steady state green color on a more or less permanent basis. Because of this, for simple implementations, a static multi-wavelength interface indicator (such as a colored sticker or colored tag) could be used as the indicator for multi-wavelength interfaces. A static multi-wavelength interface indicator like a colored sticker or colored tag is passive and would not require electrical power.

An interface indicator can have additional states beyond the steady state used to indicate the connection between a uni-wavelength interface and a multi-wavelength interface. For instance, a given indicator may also assume a blinking state, wherein—for the case of a multi-color light source—the indicator may blink on and off (i.e., color and no color) at a fast but visible rate in a continuous manner. Such a state could be used to indicate that there is a problem associated with the connection. For instance, when a fiber cut occurs that disrupts the flow of wavelengths through a multi-wavelength interface, the associated multi-wavelength interface indicator may blink on and off at a visible rate in order to visual indicate the problem. In the previously discussed network illustration, once the fiber cut to fiber 150e is detected and reported, and before a restoration takes place, the uni-wavelength interface indicator 113a in node 110, and the uni-wavelength interface indicator 133c in node 130 could both visibly blink. For this case, indicator 113a may blink on and off with the color associated with multi-wavelength interface indicator 114a, and indicator 133c may blink on and off with the color associated with multi-wavelength interface indicator 134a.

Beyond fiber cuts, a blinking state could be used to indicate any problem that affects a connection between two interfaces within a network. For instance, if there was fiber connectivity between a uni-wavelength interface in one node and an uni-wavelength interface in another node, but for protocol reasons (or some other reason) information was not flowing between the two uni-wavelength interfaces, the interface indicators associated with the two uni-wavelength interfaces may be configured to blink on and off (i.e., color followed by no color). Once the problem is cleared—and information flows between the two uni-wavelength interfaces—the blinking would be stopped, and the uni-wavelength interface indicators of the two uni-wavelength interfaces would assume their non-blinking steady state values associated with the multi-wavelength interface that they are connected to locally (via an intra-node connection). For the case wherein a multi-color light source is used as an indicator for the uni-wavelength interface, once the problem is cleared, the indicator would be illuminated in a steady state with the color associated with the multi-wavelength interface indicator of the multi-wavelength interface that it is locally (within the node) connected to.

In one embodiment, when an inter-node connection between a uni-wavelength interface in one node and a uni-wavelength interface in another node has a problem such that information does not flow between the two uni-wavelength interfaces, the uni-wavelength interface indicators on the uni-wavelength interfaces will blink, but the multi-wavelength interface indicators on the multi-wavelength interfaces that they are locally connected to (via intra-node connections) will not blink. An exception to this may be for the case where there is a direct problem with a given multi-wavelength interface. For instance, for a connection from interface 111a to 131c through node 140, if the fiber 150e attached to multi-wavelength interface 132a is cut, such that the connection between interface 111a and interface 131c is disrupted, the multi-wavelength interface indicator 134a may optionally be blinked on and off, since all connections through interface 132a are no longer possible. For this case, the multi-wavelength interface indicator 114a of multi-wavelength interface 112a in node 110 does not blink on and off, since connections to node 140 are still possible through multi-wavelength interface 112a.

At least one additional state (color) may be used beyond those needed to support the n multi-wavelength interfaces within an optical node. The additional state (color) may be used to indicate that a given uni-wavelength interface is not connected to any of the multi-wavelength interfaces within the optical node. If multi-color light sources are used as interface indicators, if no connection is made between a given uni-wavelength interface and any of the multi-wavelength interfaces, the uni-wavelength interface indicator of the given uni-wavelength interface may be illuminated with a color different than any of the colors associated with any of the multi-wavelength interfaces within the node. Optionally, if no connection is made between a given uni-wavelength interface and any of the multi-wavelength interfaces, the uni-wavelength interface indicator of the given uni-wavelength interface may be illuminated with a color different than any of the colors associated with any of the multi-wavelength interfaces within the node, and the uni-wavelength interface indicator of the uni-wavelength interface may additionally be blinked on and off at a visible rate. As yet another option, if no connection is made between a given uni-wavelength interface and any of the multi-wavelength interfaces, the uni-wavelength interface indicator of the given uni-wavelength interface may be extinguished (i.e., turned off so that no color is illuminated).

The optical nodes 110, 120, 130, and 140 may be constructed in such a way that a given uni-wavelength interface can broadcast its associated wavelength to more than one multi-wavelength interface. This type of operation would be especially useful for video distribution applications. For this case, the uni-wavelength interface indicator associated with the uni-wavelength interface whose wavelength is being broadcasted to multiple multi-wavelength interfaces may cycle through (sequence through) the states of the multi-wavelength interface indicators of the multi-wavelength interfaces that it is broadcasting to. More specifically, when a connection is between a uni-wavelength interface and a first and at least a second multi-wavelength interface, the uni-wavelength interface indicator associated with the uni-wavelength interface cycles through the indicator states of the multi-wavelength interface indicators of the first multi-wavelength interface and the at least second multi-wavelength interface. As an example, if uni-wavelength interface 111a is broadcasting to both multi-wavelength interface 112a and 112b, and the indicator states associated with the multi-wavelength interface indicators 114a and 114b are the colors blue and green respectively, then the uni-wavelength interface indicator 113a of uni-wavelength interface 111a will cycle (sequence) through the colors blue and green at a slow and visible rate. In other words, the interface indicator 113a will alternate between blue and green.

In more general terms, the invention may be described as an apparatus comprising a first multi-wavelength interface with a first multi-wavelength interface indicator capable of indicating a first state, at least a second multi-wavelength interface with a second multi-wavelength interface indicator capable of indicating a second state, and at least one uni-wavelength interface with a uni-wavelength interface indicator capable of indicating the first state and the second state. A connection between the at least one uni-wavelength interface and the first multi-wavelength interface is indicated by the uni-wavelength interface indicator indicating the first state. A connection between the at least one uni-wavelength interface and the at least second multi-wavelength interface is indicated by the uni-wavelength interface indicator indicating the second state.

The apparatus may further comprise at least a third multi-wavelength interface with a third multi-wavelength interface indicator capable of indicating a third state. For this case, the uni-wavelength interface indicator is further capable of indicating the third state. A connection between the at least one uni-wavelength interface and the first multi-wavelength interface, and the at least one uni-wavelength interface the at least second multi-wavelength interface, and the at least one uni-wavelength interface the at least third multi-wavelength interface is indicated by the uni-wavelength interface indicator cycling (sequencing) from the first state, to the second state, to the third state, and back to the first state.

The uni-wavelength indicator and the multi-wavelength indicators may be multi-color light sources (such as multiple LEDs), or alphanumeric displays.

In an optical network, when using multi-color light sources as interface indicators, when a first uni-wavelength interface of a first optical node is configured to be connected to a second uni-wavelength interface of a second optical node through a first multi-wavelength interface of the first optical node, and additionally when the first uni-wavelength interface of a first optical node is configured to be connected to a third uni-wavelength interface of a third optical node through a second multi-wavelength interface of the first optical node, the color of the uni-wavelength interface indicator of the first uni-wavelength interface is configured to visibly cycle through the two colors of the multi-wavelength interface indicators of the first multi-wavelength interface and the second multi-wavelength interface. If there is a problem with the connection between the first uni-wavelength interface and the second uni-wavelength interface, the uni-wavelength interface indicator of the first uni-wavelength interface is configured to visibly slowly cycle through the two colors of the multi-wavelength interface indicators of the first multi-wavelength interface and the second multi-wavelength interface, and the indicator of the first uni-wavelength interface is rapidly but visibly blinked on and off when displaying the color of the multi-wavelength interface indicator of the first multi-wavelength interface during the cycle. In other terms, the cycle may consist of multiple time periods. For instance, when cycling (sequencing) through two colors of two multi-wavelength interfaces, two time periods can be defined—the time period in which the first color (state) is displayed, and the time period in which the second color (state) is displayed. In one embodiment each time period may last 2 seconds, so that the first color (state) is displayed for 2 seconds, followed by the second color (state) being displayed for 2 seconds, followed by the first color (state) being displayed for 2 seconds, etc. For this case, when there is a problem with say the first connection (associated with the first state/color), the first color (state) will be rapidly but visibly blinked on and off for 2 seconds (perhaps on and off once every half second, for example), followed by 2 seconds in which the second color (state) is steadily displayed, followed by 2 seconds of the first color (state) being rapidly blinked on and off, followed by 2 seconds in which the second color (state) is steadily displayed, etc.

In summary, when using multi-color light sources as interface indicators within an optical node, the multi-wavelength interface indicator of multi-wavelength interface i is illuminated with color i, wherein i ranges from 1 to n, wherein n is the total number of multi-wavelength interfaces within the node. When a given uni-wavelength interface within the optical node is connected to multi-wavelength interface i, the uni-wavelength interface indicator of the uni-wavelength interface is illuminated with the color i. If a uni-wavelength interface is connected to j number of multi-wavelength interfaces, the uni-wavelength interface indicator of that uni-wavelength interface cycles (sequences) through the j colors associated with the j number of multi-wavelength interfaces.

In an optical network, when using alphanumeric displays as interface indicators, the alphanumeric display used as the first multi-wavelength interface indicator will be assigned a first alphanumeric character set (letter(s)/number(s)), and the alphanumeric display used as the second multi-wavelength interface indicator will be assigned a second alphanumeric character set (letter(s)/number(s)). When a first uni-wavelength interface of a first optical node is configured to be connected to a second uni-wavelength interface of a second optical node through the first multi-wavelength interface of the first optical node, and additionally when the first uni-wavelength interface of a first optical node is configured to be connected to a third uni-wavelength interface of a third optical node through the second multi-wavelength interface of the first optical node, the alphanumeric display of the uni-wavelength interface indicator of the first uni-wavelength interface is configured to visibly alternate between the first alphanumeric character set and the second alphanumeric character set of the multi-wavelength interface indicators of the first multi-wavelength interface and the second multi-wavelength interface. If there is a problem with the connection between the first uni-wavelength interface and the second uni-wavelength interface, the uni-wavelength interface indicator of the first uni-wavelength interface is configured to visibly alternate between the first alphanumeric character set and the second alphanumeric character set, and the indicator of the first uni-wavelength interface is rapidly but visibly blinked on and off when displaying the first alphanumeric character set. In other terms, the cycle may consist of multiple time periods. For instance, when alternating between the first alphanumeric character set and the second alphanumeric character set of two multi-wavelength interfaces, two time periods can be defined—the time period in which the first alphanumeric character set (state) is displayed, and the time period in which the second alphanumeric character set (state) is displayed. In one embodiment each time period may last 2 seconds, so that the first alphanumeric character set (state) is displayed for 2 seconds, followed by the second alphanumeric character set (state) being displayed for 2 seconds, followed by the first alphanumeric character set (state) being displayed for 2 seconds, etc. For this case, when there is a problem with say the first connection (associated with the first state), the first alphanumeric character set will be rapidly but visibly blinked on and off for 2 seconds (perhaps on and off once every half second, for example), followed by 2 seconds in which the second alphanumeric character set is steadily displayed, followed by 2 seconds of the first alphanumeric character set being rapidly blinked on and off, followed by 2 seconds in which the second alphanumeric character set is steadily displayed, etc.

The interface indicators provide the network operator a quick an easy visual indication of the routing of all added and dropped wavelengths at a given node. This may be useful information when configuring or trouble shooting a system, and may prevent network operator errors. For instance, if a given multi-wavelength interface indicator of a given multi-wavelength interface is illuminated with a steady state 1, and there are also uni-wavelength indicators of uni-wavelength interfaces being illuminated with a steady state 1, then the network operator knows that he cannot disturb the optical link (fibers) associated with the given multi-wavelength interface.

Each multi-wavelength interface and each uni-wavelength interface will have an optical connector associated with it. For the uni-wavelength interface, the optical connector is used to connect the uni-wavelength interface to an optical transponder using optical fiber. (An optical transponder is a device that generates and terminates an optical wavelength.) For the multi-wavelength interface, the optical connector is used to connect the multi-wavelength interface to another optical node within the network using optical fiber. The uni-wavelength interface indicator for the uni-wavelength interface may preferably be located adjacent to the optical connector associated with the uni-wavelength interface. Similarly, the multi-wavelength interface indicator for the multi-wavelength interface may preferably be located adjacent to the optical connector associated with multi-wavelength interface.

The uni-wavelength interfaces 111a-c, 121a-c, 131a-c, and 141a-c may be so called colored uni-wavelength interfaces, or they may be so called colorless uni-wavelength interfaces. Each colored uni-wavelength interface has a specific wavelength assigned to it, while a colorless uni-wavelength interface can utilize any wavelength used within its associated optical network.

Figure 2:
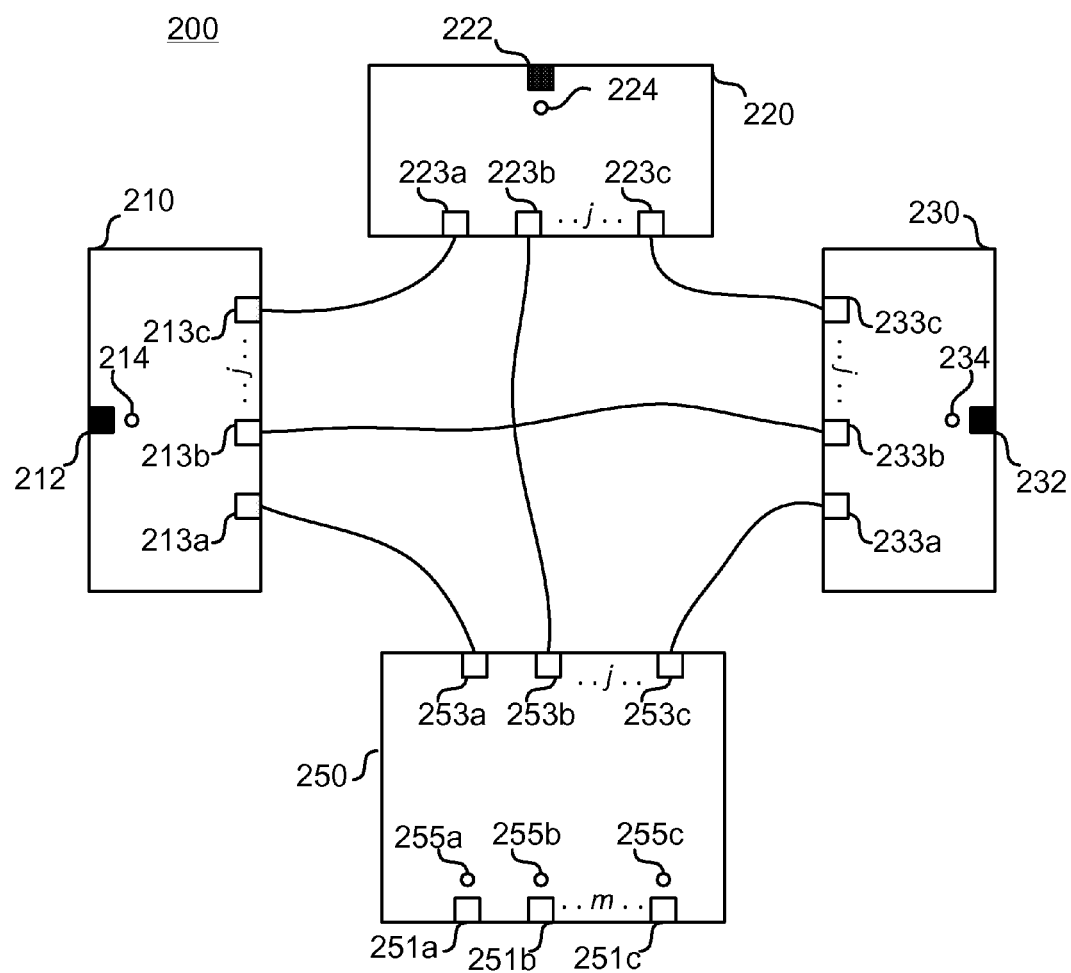
FIG. 2 is an illustration of an optical node containing three ROADMs in an example embodiment of the present invention.

Each optical node 110, 120, 130, and 140 may be constructed using one or more Reconfigurable Optical Add/Drop Multiplexer (ROADM) circuit packs. Such a node 200 is depicted in FIG. 2. Each of the three ROADM circuit packs 210, 220, and 230 provides a single multi-wavelength interface 212, 222, and 232. Associated with each multi-wavelength interface is a multi-wavelength interface indicator 214, 224, and 234. Each ROADM circuit pack additionally contains a plurality of express interfaces 213a-c, 223a-c, and 233a-c, used to interconnect each ROADM circuit pack to all other ROADM circuit packs, and also used to connect each ROADM circuit pack to a directionless add/drop circuit pack 250. The directionless add/drop circuit pack 250 contains the necessary circuitry needed to drop wavelengths from any of the three multi-wavelength interfaces 212, 222, and 232, and also contains the necessary circuitry needed to add wavelengths to any of the three multi-wavelength interfaces. For instance, in one embodiment, each ROADM circuit pack forwards all the wavelengths it receives from its multi-wavelength interface to the directionless add/drop circuit pack using the express interface connected to the directionless add/drop circuit pack. The add/drop circuit pack then forwards selected wavelengths to its directionless uni-wavelength interfaces 251a-c. In the "add" direction, the directionless add/drop circuit pack takes in added wavelengths from its uni-wavelength interfaces 251a-c, and then directs the added wavelengths to one or more of its express interfaces 253a-c, depending upon which multi-wavelength interface 212, 222, 232 the added wavelengths must be added to. In the example node 200, the uni-wavelength interface indicators 255a-c for the uni-wavelength interfaces 251a-c are located on the directionless add/drop circuit pack.

The three ROADM circuit packs and the directionless add/drop circuit pack may all be plugged into an equipment chassis. Alternatively, the three ROADM circuit packs and the directionless add/drop circuit pack may be plugged into multiple equipment chassis. Additionally, one or more ROADM circuit packs 210, 220, and 230 may be combined so as to create at least one circuit pack with at least two multi-wavelength interfaces. Additionally, one or more ROADM circuit packs 210, 220, and 230 may be combined with the directionless add/drop circuit pack. Additionally, an optical node may contain more than one directionless add/drop circuit pack.

Although not explicitly shown in FIG. 2, the express interfaces may also have corresponding interface indicators. The states of the express interface indicators on the directionless add/drop circuit pack would be configured to match the states of the corresponding multi-wavelength interface indicators of the multi-wavelength interfaces on the corresponding ROADM circuit pack. For instance, the express interface indicator for express interface 253a would be set to match the state of the multi-wavelength interface indicator 214, while the express interface indicator for express interface 253b would be set to match the state of the multi-wavelength interface indicator 224.

Figure 3:
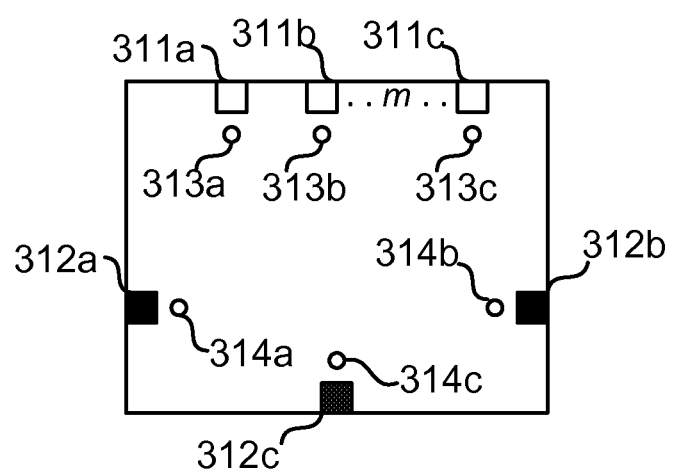
FIG. 3 is an illustration of a ROADM containing three multi-wavelength interfaces in an example embodiment of the present invention.

FIG. 3 shows a ROADM circuit pack 300 that can be plugged into an equipment chassis (not shown). The ROADM circuit pack 300 contains three multi-wavelength interfaces 312a-c instead of one. The ROADM circuit pack 300 also has a multi-wavelength interface indicator 314a-c associated with each of its multi-wavelength interfaces 312a-c. The ROADM circuit pack additionally has a plurality of directionless uni-wavelength add drop ports 311a-c built into it, each having a uni-wavelength interface indicator 313a-c. In some implementations, the ROADM circuit pack may only have a single uni-wavelength interface built into it. Each uni-wavelength interface 311a-c built into the ROADM circuit pack 300 has a uni-wavelength interface indicator 313a-c associated with it that is located on the ROADM circuit pack. In one embodiment, the ROADM circuit pack 300 may require transponders that are located external to the ROADM circuit pack 300. In another embodiment, the ROADM circuit pack may have some number of transponders built into the circuit pack. For this later case, some number of uni-wavelength interfaces may be located within the internals of the ROADM circuit pack, and would not be visible outside of the ROADM circuit pack.

The ROADM circuit packs 210, 220, 230, and 300 contain at least one multi-wavelength interface, and may use multi-color light sources for their multi-wavelength interface indicators. Each multi-wavelength interface indicator i of each multi-wavelength interface on a ROADM circuit pack is illuminated with color i, wherein i ranges from 1 to n, wherein n is the total number of multi-wavelength interfaces in the optical node. The multi-wavelength interface indicator of the at least one multi-wavelength interface on the ROADM is illuminated with the color i associated with its multi-wavelength interface. When a given uni-wavelength interface is connected to multi-wavelength interface i, the uni-wavelength interface indicator of the uni-wavelength interface is illuminated with the color i. If a uni-wavelength interface is connected to j number of multi-wavelength interfaces, the uni-wavelength interface indicator of that uni-wavelength interface cycles through the j colors associated with the j number of multi-wavelength interfaces.

Figure 4:
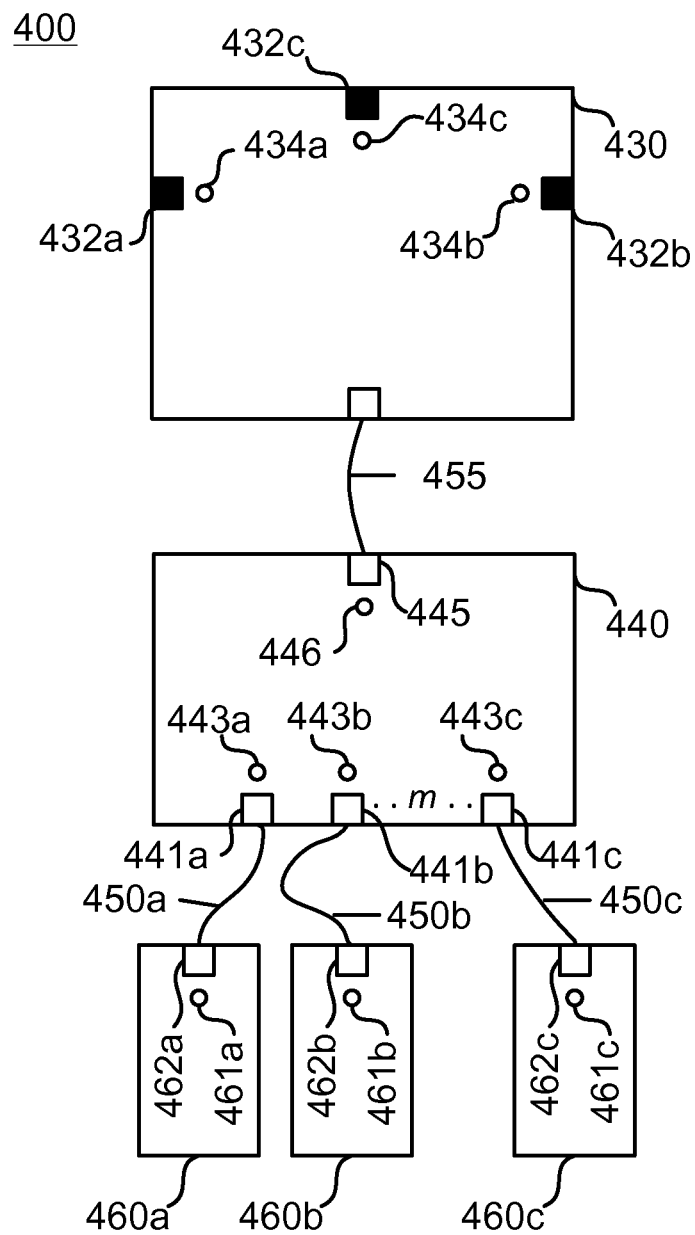
FIG. 4 is an illustration of an optical node containing a ROADM, a multiplexing and de-multiplexing device, and three transponders in an example embodiment of the present invention.

FIG. 4 depicts an optical node 400 comprising of a ROADM circuit pack 430 containing three multi-wavelength interfaces 432a-c—each with a multi-wavelength interface indicator 434a-c, a multiplexer and demultiplexer circuit pack 440 containing a plurality of directionless uni-wavelength interfaces 441a-c—each with a uni-wavelength indicator 443a-c, and a plurality of transponders 460a-c.

In the add direction, the transponders 460a-c generate a plurality of wavelengths that are forwarded to the multiplexer and demultiplexer circuit pack 440 via optical fibers 450a-c. The multiplexer and demultiplexer circuit pack multiplexes the plurality of wavelengths together to form a composite Wavelength Division Multiplexed (WDM) signal that is then forwarded to the ROADM circuit pack 430 via optical fiber 455. At each output multi-wavelength interface 432a-c of the ROADM circuit pack, wavelengths selected from the WDM signal from the multiplexer and demultiplexer circuit pack are combined with wavelengths selected from the input interfaces of the other two multi-wavelength interfaces 432a-c to form a composite WDM stream for transmission.

In the drop direction, a composite WDM signal containing selected wavelengths from the input of each multi-wavelength interface 432a-c of the ROADM circuit pack 430 are forwarded to the multiplexer and demultiplexer circuit pack 440 via fiber 455 (which may be actually two optical fibers—one for each direction). The multiplexer and demultiplexer circuit pack de-multiplexes the WDM signal and forwards one wavelength to each of the transponders 460a-c via fibers 450a-c. (Each fiber 450a-c may be actually two fibers—one for each direction.)

The uni-wavelength interface indicators 443a-c for the directionless uni-wavelength interfaces 441a-c are located on the multiplexer and demultiplexer circuit pack 440, while the multi-wavelength interface indicators 434a-c for the multi-wavelength interfaces are located on the ROADM circuit pack.

Figure 5A:
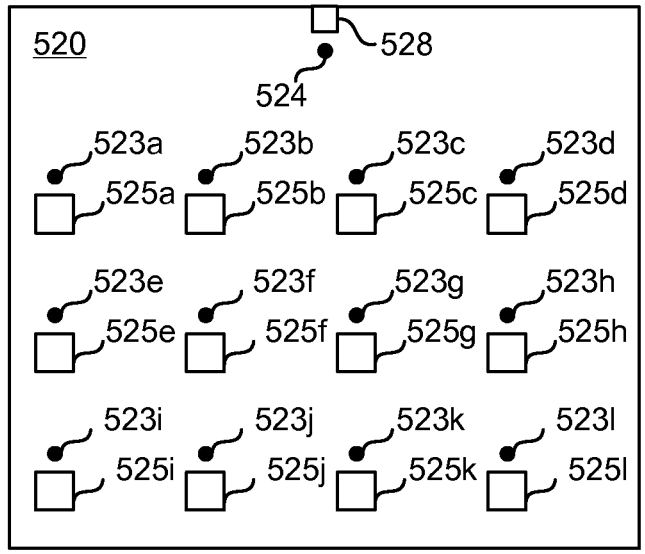
FIG. 5A is an illustration of the construction of a multiplexing and de-multiplexing circuit pack in an example embodiment of the present invention.
Figure 5A:
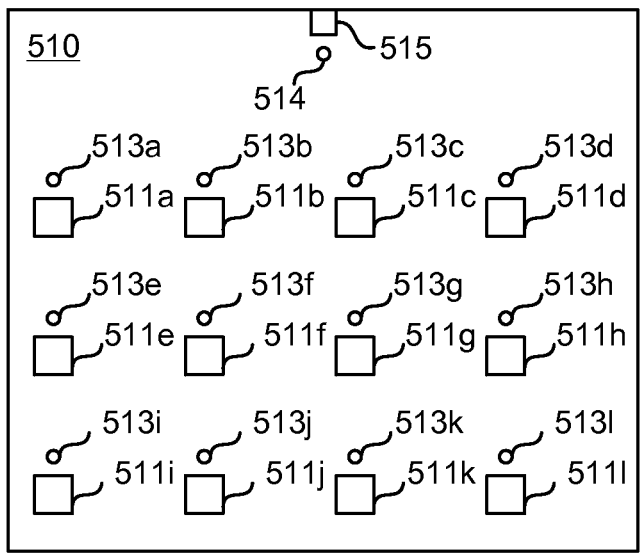
Figure 5B:
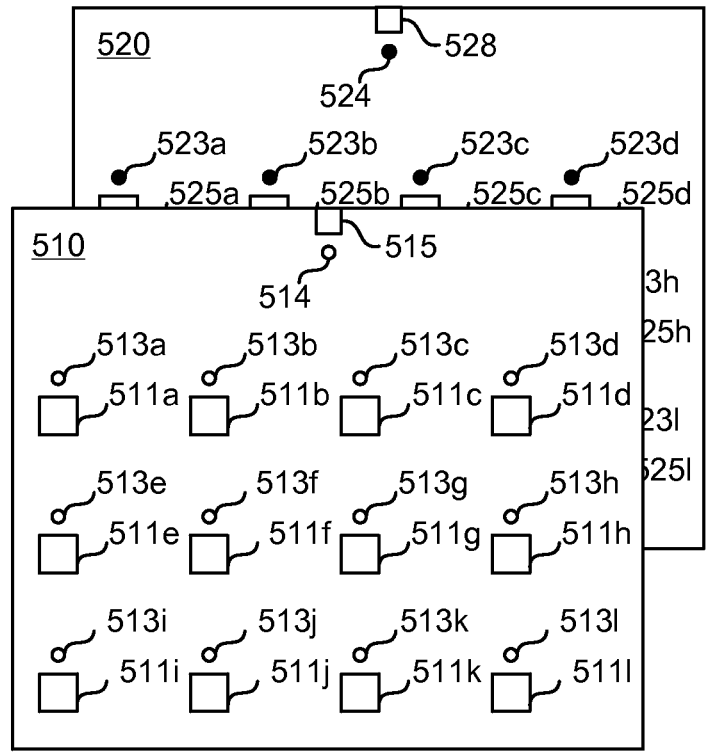
FIG. 5B is a further illustration of the construction of a multiplexing and de-multiplexing circuit pack in an example embodiment of the present invention.
Figure 5C:
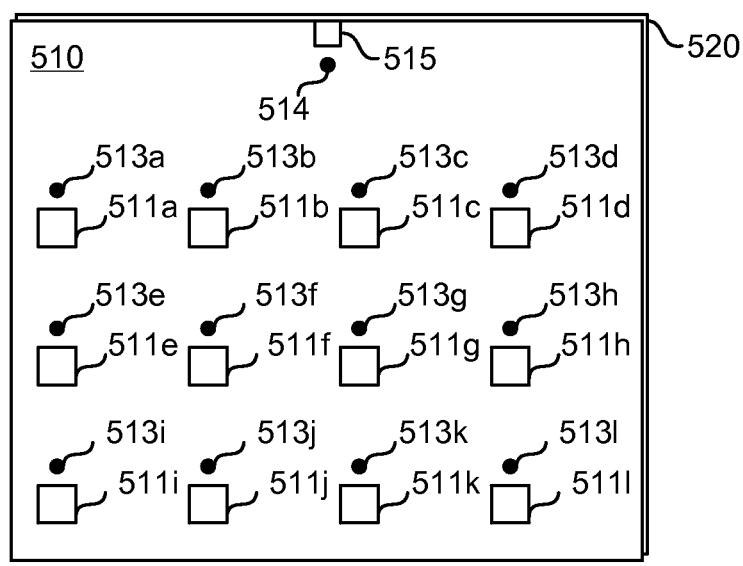
FIG. 5C is a further illustration of the construction of a multiplexing and de-multiplexing circuit pack in an example embodiment of the present invention.

The multiplexer and demultiplexer circuit pack 440 may further comprise a front panel and optical connectors for each uni-wavelength interface. Such a multiplexer and demultiplexer circuit pack 500 is illustrated in FIG. 5A, FIG. 5B, and FIG. 5C. FIG. 5A illustrates a multiplexer and demultiplexer circuit pack 500 comprising a front panel 510 and a printed circuit board 520. The front panel 510 further comprises optical connectors 511a-1, and windows 513a-1 for the uni-wavelength interface indicators located on the printed circuit board. The front panel also comprises an optical connector 515 used to optically connect the multiplexer/demultiplexer circuit pack to the ROADM circuit pack, and a corresponding window 514 for a summary indicator 524 (located on the printed circuit board). The printed circuit board 520 comprises the uni-wavelength interface indicators 523a-1, and a summary indicator 524. The printed circuit board 520 also contains holes 525a-1 and 528 through which the optical connectors 511a-1 and 515 extend through. The single printed circuit board may be mounted directly behind the front panel, so that the uni-wavelength interface indicators 523a-1 illuminate through the windows 513a-1 of the front panel. FIG. 5B illustrates the process of moving the single printed circuit board 520 behind the front panel 510, while FIG. 5C illustrates the single printed circuit board 520 fully mounted behind the front panel 510, with the uni-wavelength interface indicators 523a-1 illuminating through the windows 513a-1 of the front panel. In general, the uni-wavelength interface indicator for a given uni-wavelength interface is positioned close to the optical connector of a given uni-wavelength interface such that it's visually apparent that the given uni-wavelength interface indicator is associated with the given connector.

The windows 513a-1 consists of holes in the front panel and may further include glass or plastic covers or lenses covering the holes. There are also larger holes in the front panel where the optical connectors 511a-1 are placed—one hole for each optical connector of each uni-wavelength interface. The connectors 511a-1 will have fiber optical cables attached to them in order to attach to the multiplexing and de-multiplexing optics that sit behind the circuit board 520.

The multiplexer and demultiplexer circuit pack may optionally contain a multi-wavelength interface summary indicator 446 (associated with interface 445) and 524 (associated with interface 515), wherein the summary indicator indicates if there are connections between the uni-wavelength interfaces and any of the multi-wavelength interfaces within the node. When connections are made between the uni-wavelength interfaces and only a single multi-wavelength interface, the summary indicator is illuminated with the color of the multi-wavelength interface indicator of the single multi-wavelength interface. When connections are made between the uni-wavelength interfaces and a first multi-wavelength interface, and when connections are made between the uni-wavelength interfaces and at least a second multi-wavelength interface, the summary indicator cycles (sequences) through the colors of the multi-wavelength interface indicators of the first multi-wavelength interface and the at least second multi-wavelength interface at a visible rate.

As shown in FIG. 4, the optical node 400 may additionally be comprised of a plurality of transponder circuit packs 460a-c. In the Add-Direction, each transponder circuit pack is used to generate a specific wavelength, that is then multiplexed with other wavelengths by the circuit pack 440. In the Drop-Direction, each transponder takes in a specific wavelength from the multiplexer and demultiplexer circuit pack, and converts the optical signal to an electrical format for further processing.

Each transponder additionally contains a service interface (not shown) that allows service data to be inputted into the node and removed from the node.

Each transponder 460a-c attaches to a uni-wavelength interface 441a-c of the multiplexer and demultiplexer circuit pack 440 via a pair of optical fibers that run from an optical connector on the transponder 462a-c to an optical connector on the uni-wavelength interface 441a-c on the multiplexer and demultiplexer circuit pack. Each transponder may additionally contain a uni-wavelength interface indicator 461a-c, wherein the state of the uni-wavelength interface indicator on the transponder matches the state of the uni-wavelength interface indicator 443a-c of the uni-wavelength interface that the transponder is attached to on the multiplexer and demultiplexer circuit pack 440.

Each multi-color light source may be implemented with a multi-color Light Emitting Diode (LED) or some other similar suitable light source. Alternatively, other technologies could be used to implement the multi-wavelength interface indicators. For instance, a single-digit alphanumeric display could be used to indicate multi-wavelength interfaces. In such an implementation each multi-wavelength interface may have a single-letter/digit alphanumeric display associated with it, and each uni-wavelength interface may have a single-letter/digit alphanumeric display associated with it. The alphanumeric display of each multi-wavelength interface would be illuminated with a specific and distinct letter/number. When a connection is made between a given uni-wavelength interface and a given multi-wavelength interface, the uni-wavelength interface indicator of the uni-wavelength interface would be set to the letter/number of the multi-wavelength interface indicator of the multi-wavelength interface that it is connected to.

Alternatively, an alphanumeric display with a plurality of letters/digits could be utilized. For such an implementation, whole words, such as EAST or WEST, or city names, such as Chicago or New York, could be displayed.

A multi-color LED used as an interface indicator may comprise at least two co-located LEDs (i.e., two LED emitters) of different optical wavelengths. Each of the at least two LEDs would generate a distinct visible color when illuminated. An at least first and second LEDs may be co-packaged so that when both LEDs are illuminated the visible colors of the two LEDs mix together in such a way that the two LEDs appears to be a single light source. The co-packaged first and second LEDs could be used for all interface indicators. In order to indicate a first multi-wavelength interface, the first LED may be illuminated and the second LED may be extinguished. In order to indicate a second multi-wavelength interface, the second LED may be illuminated and the first LED may be extinguished. A third color could be used to indicate a third multi-wavelength interface by simultaneously illuminating both LEDs in order to mix the colors of the first and second LEDs to create a third color.

Alternatively, a multi-color LED used as an interface indicator may consist of at least three co-packages LEDs (i.e., three LED emitters) of different optical wavelengths. If the first, second, and third co-packaged LEDs emit the three primary colors—red, green, and blue, respectively—then an additional number of colors can be created by illuminating certain combinations of the three LEDs simultaneously. For instance, the first LED may be illuminated and the second and third LEDs may be extinguished in order to indicate a first multi-wavelength interface, and the second LED may be illuminated and the first and third LEDs may be extinguished in order to indicate a second multi-wavelength interface, and the second and third LEDs may be illuminated and the first LED may be extinguished in order to indicate a third multi-wavelength interface. Alternatively, additional colors may be achieved by simultaneously mixing various intensities of the colors of the three LEDs. Various intensities can be achieved by varying the current through the LEDs, or by using well known pulse width modulation techniques.

Each multi-wavelength indicator may be assigned an additional state which may be used to indicate that there are no wavelengths transitioning through the indicator's corresponding multi-wavelength interface (either to or from any uni-wavelength interfaces, or to and from any other multi-wavelength interfaces). This additional state may be a specific color when multi-color indicators are used. Alternatively, the additional state could be indicated by turning off the indicator (e.g., no color). The additional state would be useful when performing maintenance on multi-wavelength interfaces.

This invention further includes a method of indicating the connection between interfaces. The method comprises indicating a first state with a first interface indicator of a first interface, indicating a second state with a second interface indicator of a second interface, and indicating the first state and the second state with a third interface indicator of a third interface. Within the method, the third interface indicator indicates a connection between the third interface and the first interface by indicating the first state, and the third interface indicator indicates a connection between the third interface and the second interface by indicating the second state.

Within the method, the first and second interfaces may be multi-wavelength interfaces, and the third interface may be a uni-wavelength interface.

In the method, the first interface indicator may include a first light emitting diode, and the second interface indicator may include a second light emitting diode, and the third interface indicator may include a third light emitting diode.

Alternatively, in the method, the first interface indicator may comprise a first alphanumeric display, and the second interface indicator may comprise a second alphanumeric display, and the third interface indicator may comprise a third alphanumeric display.

Alternatively, in the method, the first interface indicator may include a first passive indicator, and the second interface indicator may include a second passive indicator, and the third interface indicator may include an active indicator of some type (multi-color or alphanumeric, for example).

Alternatively, in the method, the first interface indicator may comprise at least two light emitting diodes, and the second interface indicator may comprise at least two light emitting diodes, and the third interface indicator may comprise at least two emitting diodes.

Within the method, the first state may be indicated by a first color and the second state may be indicated by a second color.

Also, within the method, a connection between the third interface and the first interface, and the third interface and the second interface may be indicated by the third interface indicator alternating between the first state and the second state.

The invention may be extended to general interfaces within and apparatus. For this case, there may be an apparatus comprising a first interface with a first interface indicator capable of indicating a first state. Additionally within the apparatus there may be a second interface with a second interface indicator capable of indicating a second state. Furthermore, within the apparatus there may be at least a third interface with a third interface indicator capable of indicating the first state and the second state. Additionally, the apparatus may contain a means for establishing connections between interfaces. For such an apparatus, a connection between the at least third interface and the first interface may be indicated by the third interface indicator indicating the first state, and a connection between the at least third interface and the second interface may be indicated by the third interface indicator indicating the second state. The first and second interfaces may be multi-wavelength interfaces, and the third interface may be a uni-wavelength interface. The first interface indicator within this apparatus may include a first light emitting diode, and the second interface indicator may include a second light emitting diode, and the third interface indicator may include a third light emitting diode. Alternatively, the first interface indicator may comprise a first alphanumeric display, and the second interface indicator may comprise a second alphanumeric display, and the third interface indicator may comprise a third alphanumeric display. In yet another alternative, or additionally, the first interface indicator may include a first passive indicator, and the second interface indicator may include a second passive indicator, and the third interface indicator may include an active indicator. Alternatively, the first interface indicator may comprise at least two light emitting diodes, and the second interface indicator may comprise at least two light emitting diodes, and the third interface indicator may comprise at least two emitting diodes. Within this apparatus, the first state may be indicated by a first color and the second state may be indicated by a second color. Furthermore, a connection between the at least third interface and the first interface, and the at least third interface the second interface may be indicated by the third interface indicator alternating between the first state and the second state. The apparatus may further comprise at least a fourth interface with a fourth interface indicator capable of indicating a third state, wherein the third interface indicator may further be capable of indicating the third state, and wherein a connection between the at least third interface and the first interface, and the at least third interface the second interface, and the at least third interface and the at least fourth interface may be indicated by the third interface indicator sequencing from the first state, to the second state, to the third state, and back to the first state.

The invention may be simplified to apply to only two interfaces within an apparatus. For this case, there may be an apparatus comprising a first interface with a first interface indicator capable of indicating a first state, and at least a second interface with a second interface indicator capable of indicating the first state and at least a second state. Additionally, the apparatus may contain a means for establishing a connection between the two interfaces. For such an apparatus, a connection between the at least second interface and the first interface may be indicated by the second interface indicator indicating the first state. When there is no connection between the at least second interface and the first interface the second interface indicator may indicate the second state. The first interface indicator within this apparatus may include a first light emitting diode, and the second interface indicator may include a second light emitting diode. Alternatively, the first interface indicator may comprise a first alphanumeric display, and the second interface indicator may comprise a second alphanumeric display. In yet another alternative, or additionally, the first interface indicator may include a first passive indicator, and the second interface indicator may include an active indicator. Alternatively, the first interface indicator may comprise at least two light emitting diodes, and the second interface indicator may comprise at least two light emitting diodes. Within this apparatus, the first state may be indicated by a first color and the second state may be indicated by a second color. Alternatively, the first state may be indicated by a color and the second state may be indicated by no color.

The invention may be simplified to apply to only two interfaces within a method for indicating connections between interfaces. For this case, a method for indicating connections between interfaces may comprise indicating a first state with a first interface indicator of a first interface, and indicating the first state and a second state with a second interface indicator of a second interface. For this method, the second interface indicator may indicate a connection between the second interface and the first interface by indicating the first state, and the second interface indicator may indicate no connection between the first interface and the second interface by indicating the second state. Within the method, the first interface indicator may include a first light emitting diode and the second interface indicator may include a second light emitting diode. Alternatively, the first interface indicator may comprise a first alphanumeric display, and the second interface indicator may comprise a second alphanumeric display. Additionally or alternatively, the first interface indicator may include a passive indicator, and the second interface indicator may include an active indicator. Alternatively, the first interface indicator may comprise at least two light emitting diodes, and the second interface indicator may comprise at least two light emitting diodes. Additionally, the first state may be indicated by a first color and the second state may be indicated by a second color. In yet another alternative, the first state may be indicated by a color and the second state may be indicated by no color.

The optical node may be simplified such that the optical node comprises a first optical interface, with a first interface indicator, and at least a second optical interface, with a second interface indicator, wherein the first interface indicator and the second interface indicator visually indicate a connection between the first optical interface and the second optical interface. Within this optical node, the first interface indicator may include a first light emitting diode, and the second interface indicator may include a second light emitting diode. Alternatively, the first interface indicator may comprise a first alphanumeric display, and the second interface indicator may comprise a second alphanumeric display. Additionally or alternatively, the first interface indicator may include a passive indicator, and the second interface indicator may include an active indicator. Additionally, the first interface indicator may comprise at least two light emitting diodes, and the second interface indicator may comprise at least two light emitting diodes. The optical node may further comprise at least one ROADM circuit pack, wherein the ROADM circuit pack may comprise the first interface and the first interface indicator. The optical node may further comprise at least one multiplexer and demultiplexer circuit pack comprising the at least second interface and the second interface indicator.

In the foregoing description, the invention is described with reference to specific example embodiments thereof. It will, however, be evident that various modifications and changes may be made thereto without departing from the broader spirit and scope of the present invention. The specification and drawings are accordingly to be regarded in an illustrative rather than restrictive sense.

What is claimed is:

1. An apparatus comprising:
a first multi-wavelength interface with a first multi-wavelength interface indicator, wherein the first multi-wavelength interface indicator comprises of one Light Emitting Diode (LED) illuminating with a first color;
at least a second multi-wavelength interface with a second multi-wavelength interface indicator, wherein the second multi-wavelength interface indicator comprises of one LED illuminating with a second color, wherein the second color is different than the first color; and
a first uni-wavelength interface with a first uni-wavelength interface indicator, wherein the first uni-wavelength interface indicator comprises of one multi-color LED,
wherein the first uni-wavelength interface indicator is operable to illuminate with the first color to visually indicate a connection between the first uni-wavelength interface and the first multi-wavelength interface, and wherein the first uni-wavelength interface indicator is operable to illuminate with the second color to visually indicate a connection between the first uni-wavelength interface and the at least a second multi-wavelength interface.

2. The apparatus of claim 1, wherein the first multi-wavelength interface indicator comprises of one multi-color LED, and the second multi-wavelength interface indicator comprises of one multi-color LED.

3. The apparatus of claim 1, wherein the first uni-wavelength interface indicator is operable to illuminating with no color to visually indicate that the first uni-wavelength interface is not connected to the first multi-wavelength interface and the first uni-wavelength interface is not connected to the at least a second multi-wavelength interface.

4. The apparatus of claim 1, wherein to visually indicate a connection between the first uni-wavelength interface and the first multi-wavelength interface and a connection between the first uni-wavelength interface and the at least a second multi-wavelength interface, the first uni-wavelength interface indicator is operable to alternate between illuminating with the first color and the second color.

5. The apparatus of claim 1, further comprising at least a third multi-wavelength interface with a third multi-wavelength interface indicator, wherein the third multi-wavelength interface indicator comprises of one LED illuminating with a third color, wherein the third color is different than the first color and the second color, and wherein to visually indicate a connection between the first uni-wavelength interface and the first multi-wavelength interface and a connection between the first uni-wavelength interface and the at least a second multi-wavelength interface and a connection between the first uni-wavelength interface and the at least a third multi-wavelength interface, the first uni-wavelength interface indicator is operable to cycle through illuminating with the first color and the second color and the third color.

6. The apparatus of claim 1, further comprising a plurality of additional uni-wavelength interfaces with a plurality of additional uni-wavelength interface indicators, wherein the plurality of additional uni-wavelength interface indicators are operable to illuminate with the first color to visually indicate connections between the plurality of additional uni-wavelength interfaces and the first multi-wavelength interface, and wherein the plurality of additional uni-wavelength interface indicators are operable to illuminate with the second color to visually indicate connections between the plurality of additional uni-wavelength interfaces and the at least a second multi-wavelength interface.

7. The apparatus of claim 1, further comprising a plurality of additional uni-wavelength interfaces with a plurality of additional uni-wavelength interface indicators, wherein the apparatus is operable to make connections between interfaces using wavelengths, wherein the plurality of additional uni-wavelength interface indicators are operable to illuminate with the first color to visually indicate connections between the plurality of additional uni-wavelength interfaces and the first multi-wavelength interface when the plurality of additional uni-wavelength interfaces are connected to the first multi-wavelength interface using wavelengths, and wherein the plurality of additional uni-wavelength interface indicators are operable to illuminate with the second color to visually indicate connections between the plurality of additional uni-wavelength interfaces and the at least a second multi-wavelength interface when the plurality of additional uni-wavelength interfaces are connected to the at least a second multi-wavelength interface using wavelengths.

8. The apparatus of claim 1, wherein the first multi-wavelength interface indicator is positioned close to the first multi-wavelength interface to visually indicate that the first multi-wavelength interface indicator is associated with the first multi-wavelength interface, and the second multi-wavelength interface indicator is positioned close to the at least a second multi-wavelength interface to visually indicate that the second multi-wavelength interface indicator is associated with the at least a second multi-wavelength interface, and the first uni-wavelength interface indicator is positioned close to the first uni-wavelength interface to visually indicate that the first uni-wavelength interface indicator is associated with the first uni-wavelength interface.

9. The apparatus of claim 1, further comprising at least a second uni-wavelength interface with a second uni-wavelength interface indicator, wherein the second uni-wavelength interface indicator comprises of one multi-color LED, and wherein the second uni-wavelength interface indicator is operable to illuminate with the first color to visually indicate a connection between the at least a second uni-wavelength interface and the first multi-wavelength interface, and wherein the second uni-wavelength interface indicator is operable to illuminate with the second color to visually indicate a connection between the at least a second uni-wavelength interface and the at least a second multi-wavelength interface.

10. The apparatus of claim 9, further comprising of at least one front panel with space allocated for indicators, wherein a space of one LED is allocated on the at least one front panel for the first uni-wavelength interface indicator and for the second uni-wavelength interface indicator.

11. A method for visually indicating connections between interfaces comprising:
    configuring a first Light Emitting Diode (LED) of a first interface with a first color;
    configuring a second LED of a second interface with a second color, wherein the second color is different than the first color;
    configuring a multi-color LED of a third interface with the first color when connecting the third interface to the first interface; and
    configuring the multi-color LED of the third interface with the second color when connecting the third interface to the second interface.

12. The method of claim 11, further comprising configuring a plurality of additional multi-color LEDs of a plurality of additional interfaces with the first color when connecting the plurality of additional interfaces to the first interface, and configuring the plurality of additional multi-color LEDs of the plurality of additional interfaces with the second color when connecting the plurality of additional interfaces to the second interface.

13. The method of claim 11, wherein the first interface is a first multi-wavelength interface, and second interface is a second multi-wavelength interface, and the third interface is a uni-wavelength interface.

14. The method of claim 11, further comprising configuring the multi-color LED of the third interface to alternate between the first color and the second color when connecting the third interface to the first interface and the second interface.

15. An optical node providing a visual indication of connections between interfaces comprising:
    a first multi-wavelength interface with a first multi-wavelength interface indicator, wherein the first multi-wavelength interface indicator comprises of one Light Emitting Diode (LED) illuminating with a first color;
    at least a second multi-wavelength interface with a second multi-wavelength interface indicator, wherein the second multi-wavelength interface indicator comprises of one LED illuminating with a second color, wherein the second color is different from the first color; and at least one uni-wavelength interface with a uni-wavelength interface indicator, wherein the uni-wavelength interface indicator comprises of one multi-color LED, and wherein the uni-wavelength interface indicator is operable to illuminate with the first color when the uni-wavelength interface is connected to the first multi-wavelength interface, and wherein the uni-wavelength interface indicator is operable to illuminate with the second color when the uni-wavelength interface is connected to the at least a second multi-wavelength interface.

16. The optical node of claim 15, wherein the optical node is operable to establishing an inter-node connection between the at least one uni-wavelength interface and a second uni-wavelength interface of a second optical node, and wherein the uni-wavelength interface indicator is operable to alternate between illuminating with the first color and no color when there is a problem with the inter-node connection.

17. The optical node of claim 15, wherein the optical node is operable to establishing a first inter-node connection between the at least one uni-wavelength interface and a second uni-wavelength interface of a second optical node through the first multi-wavelength interface, and wherein the optical node is operable to establishing at least a second inter-node connection between the at least one uni-wavelength interface and a third uni-wavelength interface of a third optical node through the at least a second multi-wavelength interface, wherein the uni-wavelength interface indicator is operable to alternate between illuminating with the first color during a first time period and the second color during a second time period to indicate the first inter-node connection and the at least a second inter-node connection.

18. The optical node of claim 17, wherein the uni-wavelength interface indicator is operable to alternate between illuminating with the first color and no color during the first time period to indicate a problem with the first inter-node connection.

19. The optical node of claim 15, further comprising at least one ROADM circuit pack comprising the first multi-wavelength interface and the first multi-wavelength interface indicator.

20. The optical node of claim 15, further comprising at least one multiplexer and demultiplexer circuit pack comprising the at least one uni-wavelength interface and the uni-wavelength interface indicator.

21. The optical node of claim 15, further comprising at least one optical transponder comprising a second uni-wavelength interface indicator, wherein the second uni-wavelength interface indicator is operable to illuminating with a color that matches the color of the uni-wavelength interface indicator.

* * * * *